United States Patent [19]

Kuriki et al.

[11] Patent Number: 5,366,236
[45] Date of Patent: Nov. 22, 1994

[54] HYDRAULIC CONTROL DEVICE FOR ACTIVE SUSPENSION SYSTEM

[75] Inventors: Nobuharu Kuriki; Seiji Ohsaki, Saitama; Hideaki Shibue; Yoshiaki Noro, all of Saitama, Japan

[73] Assignee: Honda Giken Kogyo Kabushiki Kaisha, Tokyo, Japan

[21] Appl. No.: 925,991

[22] Filed: Aug. 6, 1992

[30] Foreign Application Priority Data

Aug. 6, 1991 [JP] Japan ............... 3-220987

[51] Int. Cl.⁵ ........................... B60G 17/00
[52] U.S. Cl. ........................................ 280/707
[58] Field of Search ............ 280/707, 714, 709

[56] References Cited

FOREIGN PATENT DOCUMENTS

| 3638575 | 5/1988 | Germany | 280/714 |
| 3742883 | 7/1989 | Germany | 280/714 |
| 62-1611 | 1/1987 | Japan |  |
| 403025015 | 2/1991 | Japan | 280/714 |
| 403025016 | 2/1991 | Japan | 280/714 |

*Primary Examiner*—Sherman Basinger
*Attorney, Agent, or Firm*—Irving M. Weiner; Joseph P. Carrier; Pamela S. Burt

[57] ABSTRACT

In an active vehicle suspension system employing a double acting type single rod hydraulic linear actuator in which a piston is provided with two pressure receiving surfaces facing two different piston chambers defined by the piston received in a cylinder and having different areas, even when the line pressure of the hydraulic oil passage is lost, the height of the vehicle body can be maintained at a fixed level and a sudden change of the height of the vehicle body can be avoided by providing a hydraulic control device which appropriately controls the pressures of the upper and lower chambers so as to be inversely proportional to the areas of the corresponding pressure receiving surfaces as the pressure supplied to the hydraulic actuator is reduced.

6 Claims, 5 Drawing Sheets

Fig. 5

HYDRAULIC CONTROL DEVICE FOR ACTIVE SUSPENSION SYSTEM

TECHNICAL FIELD

The present invention relates to a hydraulic control device for an active vehicle suspension system which connects a wheel with a vehicle body with a double acting type single rod cylinder capable of a reciprocating movement by means of hydraulic pressure.

BACKGROUND OF THE INVENTION

Conventionally, various types of active vehicle suspension systems have been proposed. An active vehicle suspension system actively controls a vertical relative movement between a wheel and a vehicle body as the vehicle travels on various kinds of road surfaces with a linear actuating force generated by hydraulic pressure. One such example is disclosed in a Japanese patent laid open publication No. 62-1611.

In the known hydraulic actuator used in the above mentioned active suspension system, a piston is slidably received in an enclosed cylinder so as to define two oil chambers above and below the piston, the piston facing the two oil chambers with corresponding pressure receiving surfaces having different areas, so that a certain thrust may be produced between the cylinder and the piston rod according to the difference in the areas of the pressure receiving surfaces even when the pressures supplied to the two oil chambers are equal to each other. The difference in the areas of the pressure receiving surfaces is typically accounted for by the cross sectional area of the piston rod.

Typically, a bottom of the cylinder is connected with a wheel while an end of the piston rod is connected with a vehicle body, and the output pressure from the pump is directly fed into the upper piston chamber. The pressure of the lower piston chamber is feedback controlled by a pressure control valve comparing it with a certain target value which is determined according to the change in the stroke and the output speed of the hydraulic actuator so that the height of the vehicle body can be kept at a certain constant level with the wheel following the contour of the road surface.

In the above mentioned hydraulic control device, however, when the pump is not operative and the supply pressure to the hydraulic actuator is lost, it is necessary to prevent a drastic change in the height of the vehicle body. To achieve such an end, it has been proposed to disconnect the oil supply passage to the hydraulic actuator from the output of the oil pump with a switch valve and communicate the upper and lower piston chambers with each other so as to place the hydraulic actuator under pressurized condition even when the oil pump is not operative.

According to such a proposal, however, since the two pressure receiving surfaces of the piston are not equal to each other, the downward and upward thrusts acting upon the piston are not equal to each other, and an upward thrust is produced from the hydraulic actuator when the supply pressure is simply trapped in the hydraulic actuator. It is conceivable to reduce the line pressure by using a relief valve when the control action is terminated, but an accumulator for compensating the oil supply capacity is normally connected to the oil pressure supply line, and it is not possible to evenly reduce the pressures in the two piston chambers, thereby creating the tendency that the hydraulic actuator lowers the height of the vehicle when the oil pump is made inoperative.

BRIEF SUMMARY OF THE INVENTION

In view of such shortcomings of the prior art, a primary object of the present invention is to provide a hydraulic control device for an active vehicle suspension system, in which the downward and upward thrusts acting on the piston of a hydraulic actuator are made equal to each other when the supply of oil pressure to the hydraulic actuator is stopped under a certain operation mode such as when the engine of the vehicle is stopped.

A second object of the present invention is to provide a hydraulic control device for an active vehicle suspension system which is simple in structure but free from undesirable behaviors when the oil pump is made inoperative, for instance, when the engine of the vehicle is stopped, when a non-control mode is selected, or when a fail-safe action is taken.

These and other objects of the present invention can be accomplished by providing a hydraulic control device for an active suspension system employing a linear hydraulic cylinder including a piston connected in parallel with a spring between a wheel and a vehicle body, the piston having two pressure receiving surfaces of different areas, comprising: pressure relieving means for reducing pressures in two pressure chambers separated by the piston in the hydraulic cylinder so as to balance upward and downward thrusts acting upon the piston as a level of hydraulic pressure supplied to the hydraulic cylinder is reduced.

According to the above mentioned structure, the internal pressures in the upper and lower piston chambers can be gradually and evenly relieved by keeping the pressures inversely proportion to the areas of the corresponding pressure receiving surfaces when the hydraulic pump is not operative and the supply of the actuating oil is discontinued. In this case, the piston may be kept immobile with respect to the cylinder, and the hydraulic cylinder can maintain the stationary state of the vehicle body relative to the wheel.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
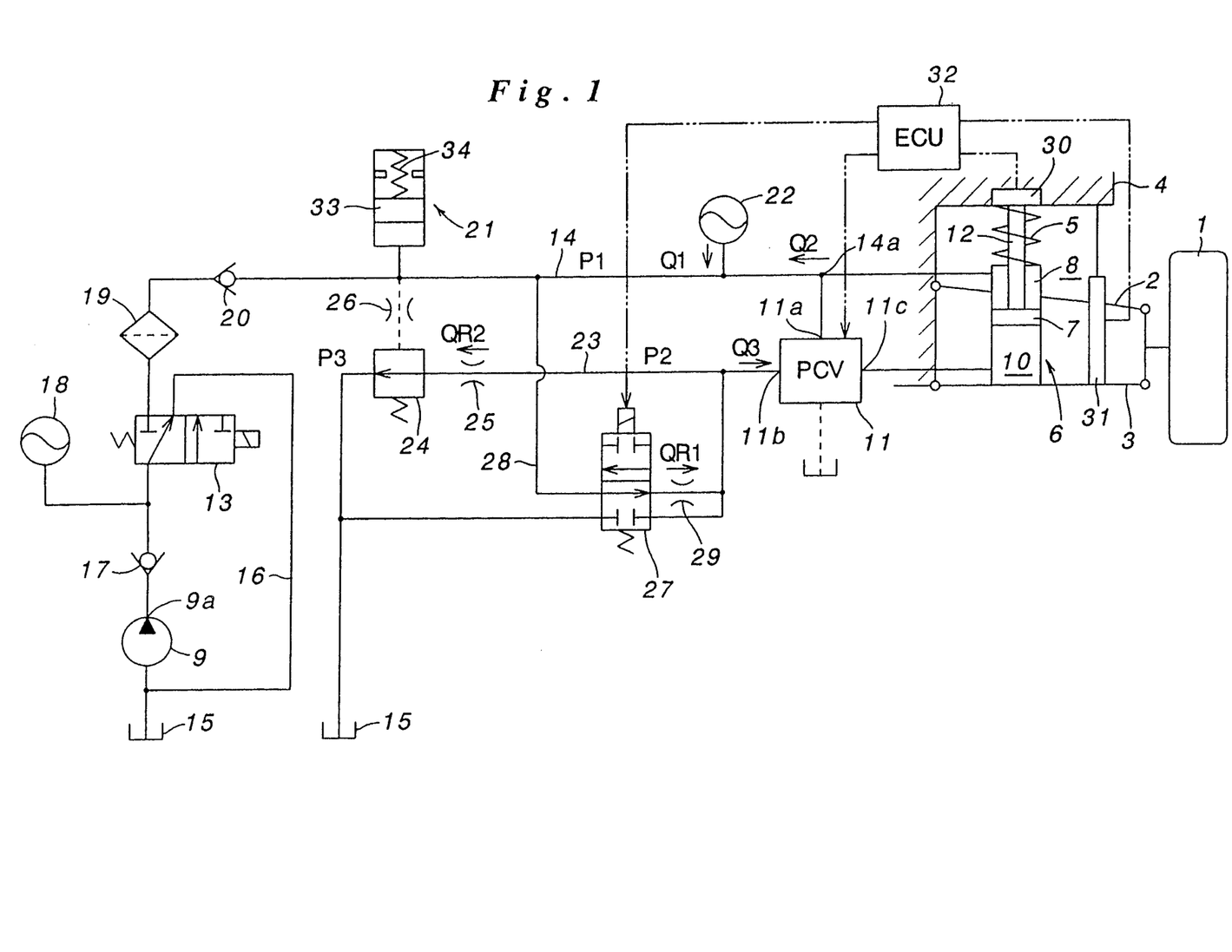
FIG. 1 is an overall circuit diagram of a first embodiment of the hydraulic control circuit for an active vehicle suspension system according to the present invention.

FIG. 1 shows the outline of the hydraulic circuit of a first embodiment of the hydraulic control circuit for an active vehicle suspension system according to the present invention. A wheel 1, which is movable in the vertical direction relative to a vehicle body 4, is supported by an upper suspension arm 2 and a lower suspension arm 3. A compression coil spring 5 and a hydraulic actuator 6 are connected between the lower suspension arm 3 and the vehicle body 4 in parallel with each other i.e., the spring is disposed coaxially about the piston rod 12 between the upper end of the actuator housing and the vehicle body.

The hydraulic actuator 6 is of a cylinder/piston type, in which actuating oil fed from a variable displacement hydraulic pump 9 is directly supplied to an upper piston chamber 8 defined by a piston 7 slidably received in a cylinder in an upper part of the cylinder, and the actuating oil, which is controlled by a control valve 11, is also supplied to a lower oil chamber 10 defined below the piston 7. A piston rod 12 is connected to the piston 7 and extends from an upper end of the cylinder. The piston rod 12 thus produces a thrust as determined by the two pressure receiving surfaces of the piston 7 facing the two piston chambers 8 and 10, and the pressures existing in the two piston chambers 8 and 10 so as to change the relative distance between the wheel 1 and the vehicle body 4. The areas of the pressure receiving surfaces of the piston 7 facing the upper and lower chambers 8 and 10 are different from each other by the cross sectional area of the piston rod 12.

An outlet port 9a of the hydraulic pump 9 is communicated with an oil supply passage 14 via an unloader valve 13. The oil supply passage 14 is branched off into two directions at a branching point 14a located at its downstream end, and one of the branched passages is communicated with the upper piston chamber 8 while the other branched passage is connected to an input port 11a of a pressure control valve (PCV) 11.

The unloader valve 13 consists of a spring offset type directional control solenoid valve which communicates the output port 9a of the hydraulic pump 9 with a reservoir tank 15 via an unloader oil passage 16 when the solenoid is de-energized, and communicates the output port 9a of the hydraulic pump 9 with the oil supply passage 14 instead of the unloader oil passage 16 when the solenoid is energized.

A check valve 17 for allowing the flow only from the output port 9a to the unloader valve 13 is connected therebetween, and an accumulator 18 for removing ripples from the pump output is connected to the downstream end of this check valve 17. A strainer 19 and a check valve 20 for allowing the flow only from the unloader valve 13 to the branching point 14a is connected in series between the unloader valve 13 and the oil supply passage 14. A low pressure accumulator 21 for accounting for the displacement of the oil by the piston rod 12 in the upper chamber 8 as the piston 7 is moved as described hereinafter as well as a normal accumulator 22 for flow rate compensation are also connected to the oil supply passage 14. The output pressure of the hydraulic pump 9 is maintained at a fixed level by a pressure regulating valve not shown in the drawings.

The pressure control valve 11 provided between the oil supply passage 14 and the lower piston chamber 10 communicates the reservoir tank 15 with the lower piston chamber 10 through an oil return passage 23 when its solenoid is de-energized, and controls the pressure of the actuating oil in the lower piston chamber 10 by changing the degree of communication between the oil supply passage 14 and the lower piston chamber 10 in accordance with the value of the electric current supplied to the solenoid when the solenoid is energized.

A balance valve 24, which is opened by a balance between a pressure from the oil supply passage 14 and a preset pressure determined by a spring force, and a relief orifice 25, which controls the flow rate of relief oil, are connected in series in the return oil passage 23. A buffer orifice 26 is provided at the control input end of the balance valve 24 for controlling the excessive response of the balance valve 24.

A switch valve 27, which can selectively switch over the communication of the return passage 23 with the oil supply passage 14 and the reservoir tank 15 is connected to a return port 11b of the pressure control valve 11. When the return passage 23 is communicated with the oil supply passage 14, the balance valve 24 is bypassed. This switch valve 27 is a spring offset type solenoid control valve which communicates the return port 11b of the pressure control valve 11 with the oil supply passage 14 when the solenoid is de-energized, and directly communicates the return port 11b of the pressure control valve 11 with the reservoir tank 15 when the solenoid is energized. A damper orifice 29 is provided in a bypass oil passage 28 which communicates the oil supply passage 14 with the return port 11b of the pressure control valve 11 when the solenoid of the switch valve 27 is de-energized for producing a damping force by applying a resistance to the oil flowing between the upper piston chamber 8 and the lower piston chamber 10 as described hereinafter.

A load sensor 30 is provided between the hydraulic actuator 6 and the vehicle body 4, and a stroke sensor 31 is provided between the lower suspension arm 3 and the vehicle body 4 to generate signals which are supplied to an electric control circuit 32 for controlling the energization of the solenoids of the pressure control valve 11 and the switch valve 27.

Now the operation of the above mentioned embodiment is described in the following.

Under the normal control mode (when the engine is operating), the output port 9a of the hydraulic pump 9 is communicated with the oil supply passage 14 by the unloader valve 13, and the return port 11b of the pressure control valve 11 is communicated with the reservoir tank 15 by the switching valve 27. The pressure from the hydraulic pump 9 is thus fed to the upper piston chamber 8 and to the input port 11a of the pressure control valve 11 via the branching point 14a of the oil supply passage 14. According to this structure, therefore, the normal active suspension control is accomplished so as to control the change in the relative distance between the wheel 1 and the vehicle body 4 by changing the value of the current supplied to the solenoid of the pressure control valve 11 and controlling the pressure of the actuating oil supplied to the lower piston chamber 10, thus producing a required stroke of the piston rod 12 of the actuator 6.

In the hydraulic actuator 6 of this embodiment, the area of the oil receiving surface of the piston 7 facing the lower chamber 10 is larger than that facing the upper chamber 8. Further, normally, the pressure from the pump 9 is directly fed to the upper piston chamber 8. Therefore, when the pressure in the upper piston chamber 8 is equal to that in the lower piston chamber 10, an upward thrust is produced in the piston rod 12 so as to increase the distance between the wheel 1 and the vehicle body 4. When the internal pressure in the lower piston chamber 10 is reduced, the thrust is diminished so as to reduce the distance between the wheel 1 and the vehicle body 4. In short, a desired stroke of the piston rod 12 of the hydraulic actuator 6 can be produced simply by controlling the increase and decrease of the hydraulic oil to the lower piston chamber 10. The thrust produced by the hydraulic actuator 6 is basically feedback controlled by the output value of the load sensor 30 for detecting the reaction of the hydraulic actuator 6 to the vehicle body 4 and/or by an output from the stroke sensor 31 for detecting the relative distance between the vehicle body 4 and the wheel 1 by using a target value associated with a predetermined spring force and damping force.

On the other hand, immediately after the engine is started or when the pressure in the oil supply passage 14 has abnormally increased, the energization of the solenoid of the unloader valve 13 is terminated so that the load of the pump may be reduced by forming a bypass passage between the output port 9a of the hydraulic pump 9 and the reservoir tank 15.

When the engine is not operated, the solenoid of the unloader valve 13 as well as the solenoid of the switching valve 27 are de-energized so that the oil supply passage 14 is disconnected from the hydraulic pump 9 and the reservoir tank 15, and communicated with the oil return passage 23. At the same time, the solenoid of the pressure control valve 11 is also deenergized, and this causes its return port 11b to be communicated with its output port 11c with the result that the upper piston chamber 8 and the lower piston chamber 10 are communicated with each other via the damper orifice 29, and the lower chamber 10 is communicated with the reservoir tank 15 via the relief orifice 25. The pressures in the both piston chambers 8 and 10 are thus gradually relieved through the relief orifice 25 according to the balance between the preset pressure of the balance valve 24 and the pressure of the oil supply passage 14 or the internal pressure of the upper piston chamber 8.

Since the oil is non-compressive, for the hydraulic actuator 6 to be kept immobile in spite of external forces, the flow rates Q2 and Q3 to the piston chambers 8 and 10 are required to be both zero. Therefore, the flow rate QR2 of the relief orifice 25, and the flow rate QR1 of the damper orifice 29 or the flow rate at the balance valve 24 are both equal to the flow rate Q1 from the accumulator 22 for flow rate compensation purpose.

Thus, the following relations hold:

$$P1-P2=C1\ QR1=C1\ Q1$$

$$P2-P3=C2\ QR2=C2\ Q1 \quad (1)$$

where

C2 is a proportion factor for the pressure loss at the relief orifice for a given flow rate;

C1 is a proportion factor for the pressure loss at the damper orifice for a given flow rate;

P1 is an internal pressure of the upper piston chamber 8;

P2 is an internal pressure of the lower piston chamber 10; and

P3 is the pressure at the output end of the balance valve 24.

When there is no pressure loss downstream of the relief orifice 25, since the output end of the balance valve 24 is at the atmospheric pressure (zero), the following relations can be obtained from Equation (1):

$$P1=(C1+C2)\ Q1$$

$$P2=C2\ Q1 \quad (2)$$

Now, $$P1{:}P2 = (C1+C2){:}C2 \quad (3)$$
$$= 1/A1{:}1/A2$$

must hold for the piston 7 to be immobile, where A1 is the area of the pressure receiving surface of the piston 7 facing the upper piston chamber 8, and A2 is the area of the pressure receiving surface of the piston 7 facing the lower piston chamber 10. Thus, by selecting C1, C2, A1 and A2 such that $$C1{:}C2=1/A1-1/A2{:}1/A2 \quad (4)$$

it is possible to prevent any stroke to be produced by the hydraulic actuator 6 because the internal pressure P1 of the upper piston chamber 8 and the internal pressure P1 of the lower piston chamber 10 are gradually relieved by maintaining the pressures P1 and P2 to be inversely proportion to the corresponding areas of the pressure receiving surfaces A1 and A2 facing the upper and lower piston chambers 8 and 10, respectively.

When the internal pressure P1 of the upper piston chamber 8 is gradually relieved and reaches the value of the preset pressure α (gauge pressure) of the balance valve 24, the balance valve 24 is then closed and the hydraulic circuit is enclosed under a pressurized condition which is slightly higher than the atmospheric pressure or at the atmospheric pressure+α. Thus, the oil passage between the two piston chambers forms a closed loop. By setting the spring constant of a biasing spring 34 of the low pressure accumulator 34 so as to place the piston 33 approximately at the center in this condition, the change in the volume of the upper piston chamber 8 by the volume displaced by the piston rod 12 is accommodated by the movement of the piston 33 in the low pressure accumulator 21 as the hydraulic actuator 6 undergoes an extending and retracting movement. Furthermore, since the pressure in the closed loop hydraulic circuit formed between the upper and lower chambers 8 and 10 of the hydraulic actuator 6 is higher than the atmospheric pressure by the preset pressure α, a passive damping force is produced as the oil flows through the damper orifice 29 in the bypass oil passage 28.

Figure 2:
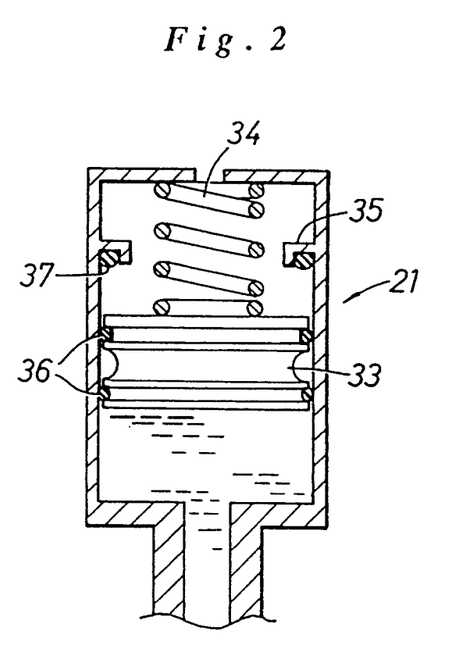
FIG. 2 is a simplified sectional view of an accumulator for compensating for the volume of the piston rod.

As shown in FIG. 2, since the low pressure accumulator 21 employs a spring-loaded piston 33, and the normal pressure range is near the atmospheric pressure, the piston 33 is normally kept immobile by a stopper 35 when the normal operating pressure is applied thereto. However, when the closed loop hydraulic circuit is placed under the slightly pressurized condition, the piston 33 is movable involving very little friction because the piston 33 is sealed by low pressure seals 36 provided on the piston 33. On the other hand, when the normal operating pressure is supplied from the hydraulic pump 9, the piston 33 is caused to adhere to a high pressure seal 37 provided on the stopper 35. Therefore, in the normal operating condition, the high pressure seal 37 ensures that presence of the low pressure accumulator 21 would not impair the favorable performance of the system.

Figure 3:
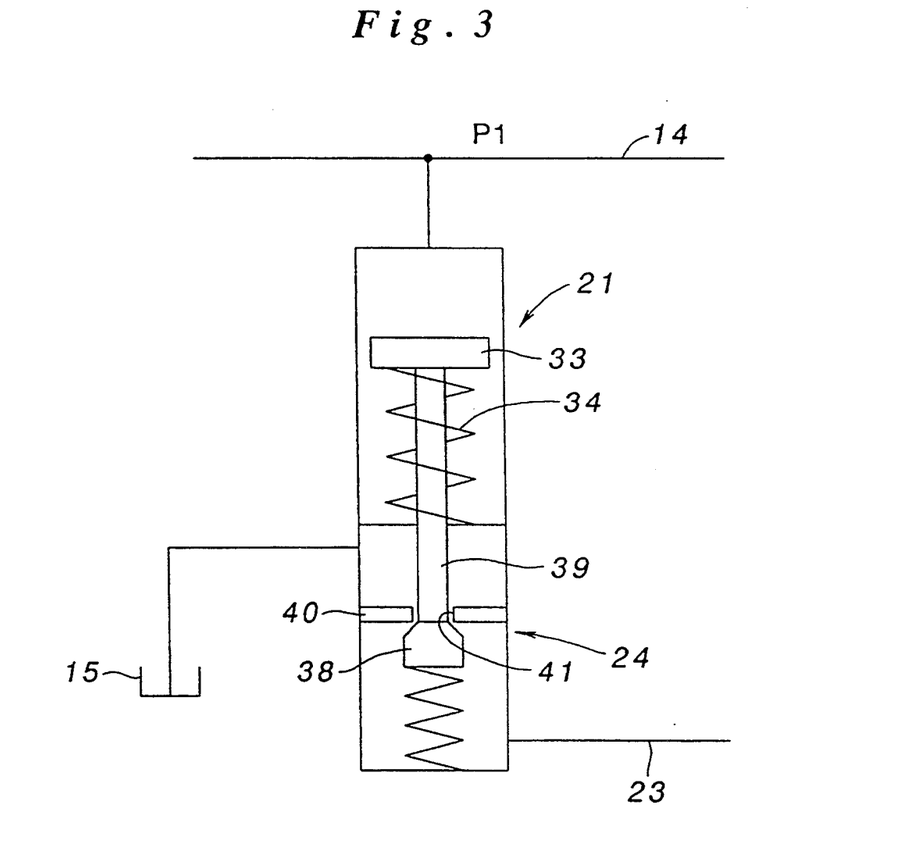
FIG. 3 is a schematic view of a modified embodiment of the accumulator for compensating for the volume of the piston rod.

As shown in FIG. 3, the balance valve 24 may be internally incorporated with the low pressure accumulator 21. According to this structure, when the internal pressure P1 in the upper piston chamber 8 is higher than a prescribed level, the piston 33 will be located lower than the center of the entire stroke of the piston 33 by virtue of the balance between the spring force of the spring 34 and the internal pressure P1. In this condition, the return oil passage 23 is communicated with the reservoir tank 15 because a poppet 38 of the balance valve 24 is pushed down by a rod 39 which is integral with the piston 33, and a communication opening 41 of a central partition wall 40 is opened up. When the internal pressure of the upper piston chamber 8 is gradually relieved and falls below the prescribed level, the hydraulic circuit is sealed off under a slightly pressurized condition or at a pressure higher than atmospheric pressure by the preset pressure $\alpha$ because the piston 33 moves upward by the spring force of the spring 34 and the communication opening 41 of the central partition wall 40 is closed by the poppet 38.

Figure 4:
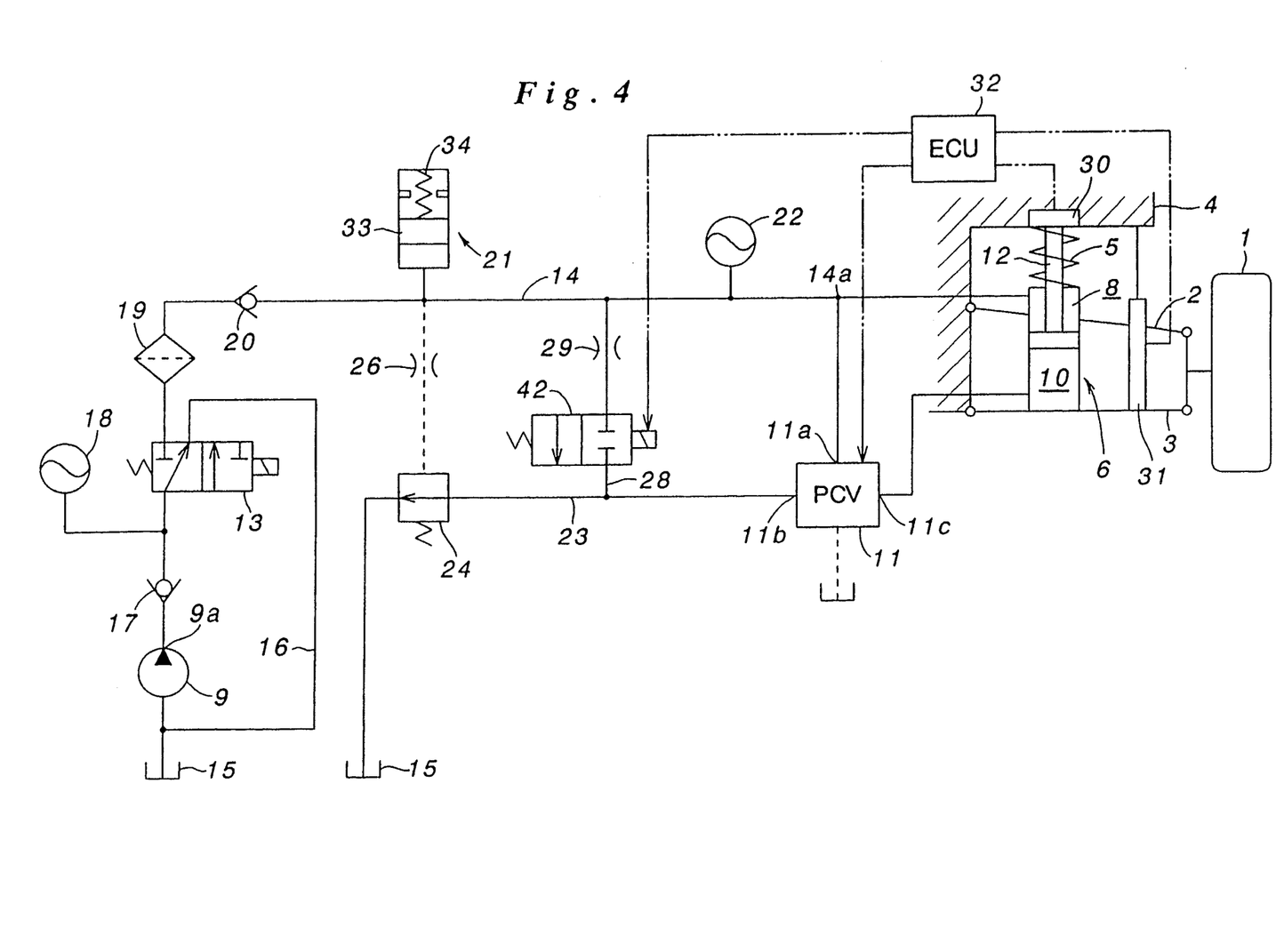
FIG. 4 is a view similar to FIG. 1 showing a second embodiment of the hydraulic control circuit for an active suspension system according to the present invention.

FIG. 4 shows a second embodiment of the present invention. In the description of the several embodiments in this application, like parts are denoted with like numerals, and the detailed descriptions of previously described parts are omitted. In this embodiment, the bypass passage 28 bypassing the hydraulic circuit between the oil supply passage 14 and the oil return passage 23 is provided with a damper orifice 29 and a solenoid control valve 42. Under the normal mode, the same control as in the first embodiment described above is carried out by the closing of the solenoid control valve 42. When the engine is not operating, however, the solenoids of the unloader valve 13 and the control valve 42 are de-energized at the same time as the solenoid of the pressure control valve 11 is deenergized so that the supply of the hydraulic oil to the hydraulic actuator 6 is discontinued and the oil supply passage 14 is communicated with the return oil passage 23. Therefore, the pressures in the two piston chambers 8 and 10 are gradually relieved in accordance with the balance between the internal pressure of the upper piston chamber 8 and the preset pressure of the balance valve 24 in same way as the above mentioned first embodiment. After the hydraulic oil circuit is sealed off under a pressure higher than the atmospheric pressure by the preset pressure $\alpha$, the movement of the piston 33 of the low pressure accumulator 21 accommodates the change in the volume of the upper piston chamber 8 caused by the displacement of the actuating oil by the piston rod as the hydraulic actuator 6 undergoes an expanding and contracting movement. Further, a passive damping force is produced as the oil is passed through the damper orifice 29 of the bypass passage 28.

Figure 5:
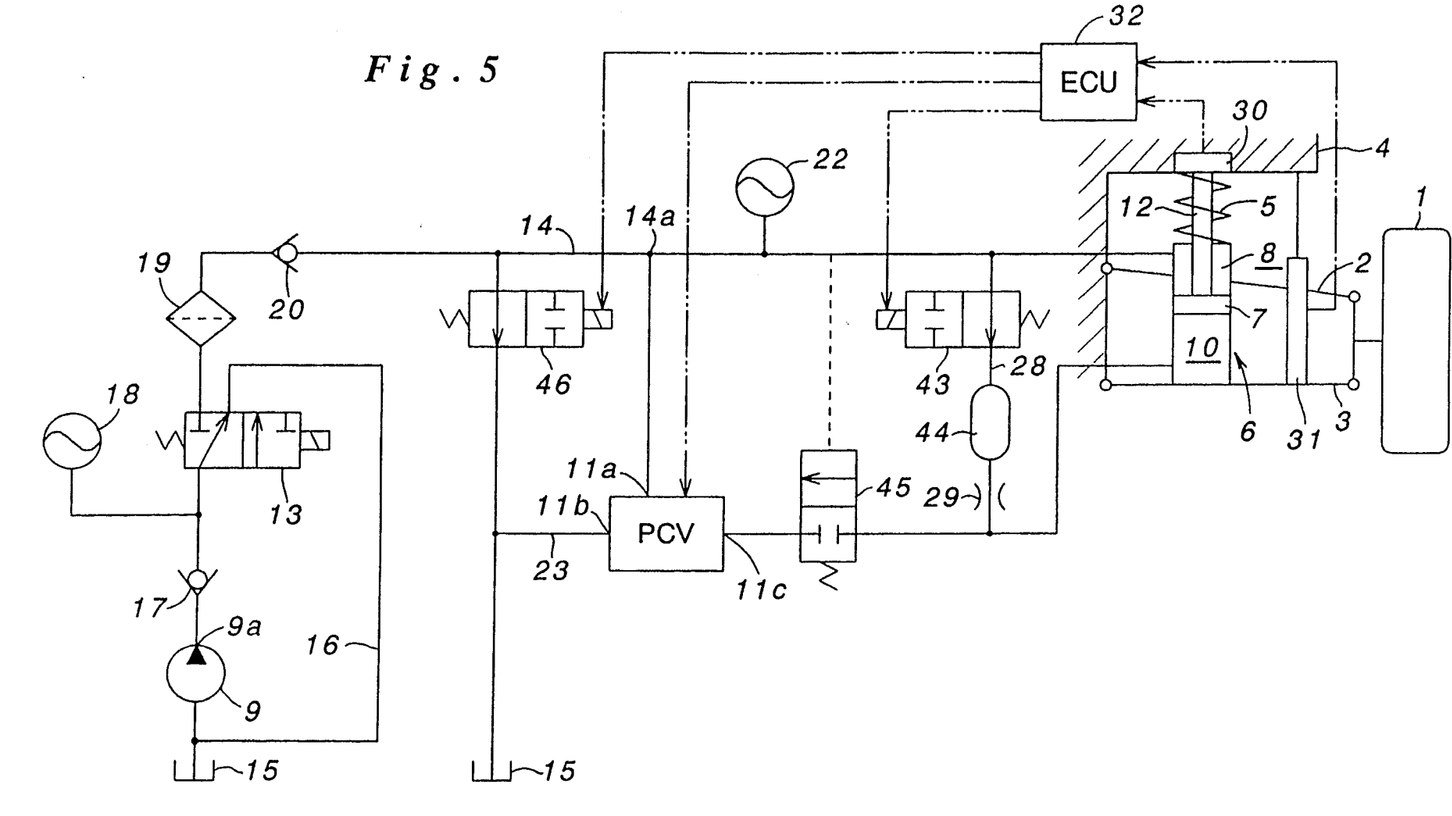
FIG. 5 is a view similar to FIG. 1 showing a third embodiment of the hydraulic control circuit for an active suspension system according to the present invention.

FIG. 5 shows a third embodiment of the present invention. In this embodiment, a first solenoid control valve 43, a storage container 44 and the damper orifice 29 are provided in series in the bypass passage 28 connecting the upper piston chamber 8 with the lower piston chamber 10. A pressure responsive solenoid control valve 45 responding to the pressure from the upper piston chamber 8 is provided between the lower piston chamber 10 and the output port 11c of the pressure control valve 11. A second solenoid control valve 46 is provided between the oil supply passage 14 and the oil return passage 23.

Under the normal mode of the hydraulic oil circuit of this embodiment, only the pressure responsive solenoid control valve 45 is opened by the pressure of the supply oil passage 14 whereas the first and second solenoid control valves are kept closed. Therefore, the stroke of the hydraulic actuator 6 can be controlled in the same way as the above mentioned first and second embodiments by controlling the pressure of the lower piston chamber 10 with the pressure control valve 11.

When a fail-safe action takes place, or when the output pressure is lost for any reason, the first and second solenoid control valves 43 and 46 are both opened, but the pressure of the accumulator 22 for flow rate compensating purpose, namely, the pressure of the upper piston chamber 8 is allowed to be gradually relieved by setting the flow rates at the return port 11b of the pressure control valve 11 and the damper orifice 29 to be substantially equal to each other. When the pressure of the upper piston chamber 8 reaches the approximate level of the atmospheric pressure, the pressure responsive solenoid control valve 45 is closed, and the lower piston chamber 10 is sealed off at the level of the atmospheric pressure. In this embodiment, because the internal pressure of the upper piston chamber 8 is ultimately opened to the atmosphere, the actuating oil may completely flow out when the hydraulic actuator 6 is fully extended. The damping force, however, can be produced, by keeping the capacity of the storage container 44 approximately equal to the effective capacity of the hydraulic actuator 6, when the actuating oil is passed between the storage container 44 and the lower piston chamber 10 via the damper orifice 29 as the hydraulic actuator 6 undergoes the expanding and contracting movement.

According to the present invention, when the hydraulic pump is not operative, the immobile state of the piston rod can be maintained because the internal pressures of the upper and lower piston chambers are relieved by keeping each pressure inversely proportional to the areas of the corresponding pressure receiving surfaces. Therefore, when a fail operation condition is produced, when the non-controlled mode is selected, or when the hydraulic line pressure is otherwise lost, a sudden change in the height of the vehicle body can be avoided and a favorable ride quality of the vehicle can be maintained at all times.

Although the present invention has been described in terms of specific embodiments, it is possible to modify and alter details thereof without departing from the spirit of the present invention.

What we claim is:

1. A hydraulic control device for an active suspension system employing a linear hydraulic cylinder including a piston connected in parallel with a spring between a wheel and a vehicle body, said piston having two pressure receiving surfaces of different areas, comprising:
   a pressure source; and
   pressure relieving means for reducing pressures in two pressure chambers separated by said piston in said hydraulic cylinder so as to balance upward and downward thrusts acting upon said piston as a level of hydraulic pressure supplied to said hydraulic cylinder is reduced.

2. A hydraulic control device for an active suspension system employing a linear hydraulic actuator including a piston connected in parallel with a spring between a wheel and a vehicle body, said piston having first and second pressure receiving surfaces of different areas facing first and second oil chambers defined and separated by said piston in said hydraulic actuator, said first pressure receiving surface being smaller than said second pressure receiving surface said control device comprising:

- a pressure source;
- a first oil passage connected between said pressure source and said first chamber;
- a pressure control valve connected between said first oil passage and said second chamber;
- a second oil passage connected to said pressure control valve for selectively relieving pressure through said pressure control valve to a pressure sink;
- a bypass passage connected between said first and second oil passages provided with a switch valve for selectively allowing at least a limited communication between said first and second chambers; and
- a balancing valve for relieving pressure from said second chamber at a rate depending on a pressure in said first chamber.

3. A hydraulic control device for an active suspension system according to claim 2, wherein said balance valve is provided with a preset pressure defining means for maintaining pressure in said second oil passage at a level slightly higher than the atmospheric pressure.

4. A hydraulic control device for an active suspension system according to claim 3, wherein the first oil passage is provided with a low pressure accumulator having an operating pressure range covering said pressure level slightly higher than the atmospheric pressure.

5. A hydraulic control device for an active suspension system according to claim 2, wherein said bypass passage is provided with a storage container containing actuating oil by an amount substantially corresponding to an effective capacity of said hydraulic actuator.

6. A hydraulic control device according to claim 1, wherein said pressure relieving means reduces the pressures of said two pressure chambers to a level near atmospheric pressure.

* * * * *